US012600689B2

(12) United States Patent
Osaki et al.

(10) Patent No.: US 12,600,689 B2
(45) Date of Patent: Apr. 14, 2026

(54) ORGANIC MATERIAL LIQUID DEHYDRATION METHOD

(71) Applicant: Asahi Kasei Kabushiki Kaisha, Tokyo (JP)

(72) Inventors: Takahiro Osaki, Tokyo (JP); Yuji Katayama, Tokyo (JP); Ryoichi Takada, Tokyo (JP); Keitaro Suzumura, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 466 days.

(21) Appl. No.: 18/272,304

(22) PCT Filed: Jan. 14, 2022

(86) PCT No.: PCT/JP2022/001207
§ 371 (c)(1),
(2) Date: Jul. 13, 2023

(87) PCT Pub. No.: WO2022/154097
PCT Pub. Date: Jul. 21, 2022

(65) Prior Publication Data

US 2024/0166574 A1 May 23, 2024

(30) Foreign Application Priority Data

Jan. 15, 2021 (JP) ................................ 2021-005211

(51) Int. Cl.
*B01D 61/00* (2006.01)
*C07B 63/00* (2006.01)

(52) U.S. Cl.
CPC .......... *C07B 63/00* (2013.01); *B01D 61/0022* (2022.08); *B01D 61/005* (2013.01); *B01D 2311/2643* (2022.08)

(58) Field of Classification Search
CPC .. C07B 63/00; B01D 61/0022; B01D 61/005; B01D 2311/2643; B01D 61/0024;
(Continued)

(56) References Cited

U.S. PATENT DOCUMENTS

| | | | |
|---|---|---|---|
| 4,793,072 | A | 12/1988 | Igarashi et al. |
| 7,955,506 | B2 | 6/2011 | Bryan et al. |

(Continued)

FOREIGN PATENT DOCUMENTS

| | | | |
|---|---|---|---|
| EP | 1032601 | A1 | 7/2022 |
| JP | S54-119096 | A | 9/1979 |

(Continued)

OTHER PUBLICATIONS

English language machine translation of JP2016155078A, 19 pages, No Date.*

(Continued)

*Primary Examiner* — Pranav N Patel
(74) *Attorney, Agent, or Firm* — Morgan, Lewis & Bockius LLP

(57) ABSTRACT

Provided is a method for processing a feed solution, which is an organic solution containing a small amount of water, using forward osmosis under a non-heated condition to obtain a dehydrated feed solution without causing degradation or change in quality of a solute. This method is for dehydrating a feed solution containing a first organic solvent, water, and a first solute, and comprises a dehydration step for bring the feed solution and an organic draw solution containing a second organic solvent into contact with each other through a forward osmosis membrane to obtain a dehydrated feed solution that has the moisture content thereof reduced to less than 1 mass % through dehydration.

16 Claims, 5 Drawing Sheets

(58) Field of Classification Search
CPC .. B01D 61/002; B01D 69/12; B01D 69/1213; B01D 69/1214; C02F 1/445
See application file for complete search history.

(56) References Cited

U.S. PATENT DOCUMENTS

| | | | |
|---|---|---|---|
| 10,040,533 | B2 | 8/2018 | Kim et al. |
| 2017/0225131 | A1 | 8/2017 | Morita et al. |
| 2021/0339194 | A1 | 11/2021 | Hotta et al. |
| 2022/0226777 | A1 | 7/2022 | Fujita et al. |

FOREIGN PATENT DOCUMENTS

| | | | |
|---|---|---|---|
| JP | S57-122914 | A | 7/1982 |
| JP | S63-156506 | A | 6/1988 |
| JP | 2012-512740 | A | 6/2012 |
| JP | 2016-155078 | A | 9/2016 |
| JP | 6526440 | B2 | 6/2019 |
| JP | 2019-187380 | A | 10/2019 |
| JP | 2020-196009 | A | 12/2020 |
| WO | 2010/080208 | A1 | 7/2010 |
| WO | 2012/102677 | A1 | 8/2012 |
| WO | 2016/024573 | A1 | 2/2016 |
| WO | 2020/050282 | A1 | 3/2020 |
| WO | 2020/241865 | A1 | 12/2020 |
| WO | 2021/054406 | A1 | 3/2021 |

OTHER PUBLICATIONS

Supplementary European Search Report issued in European Patent Application No. 22739502.7 dated May 27, 2024.

International Search Report issued in corresponding International Patent Application No. PCT/JP2022/001207 dated Mar. 22, 2022.

International Preliminary Report on Patentability and Written Opinion issued in corresponding International Patent Application No. PCT/JP2022/001207 dated Jul. 27, 2023.

* cited by examiner

ORGANIC MATERIAL LIQUID DEHYDRATION METHOD

FIELD

The present invention relates to a method for dehydrating an organic feed solution. More specifically, the present invention relates to a method for dehydrating water from a feed solution comprising an organic solvent, a small amount of water, and a solute by forward osmosis.

BACKGROUND

In various chemical processes, there is a dehydration step to remove water contained in an organic solution. For example, a feed solution is dehydrated before a chemical reaction called water-free reaction in which the desired reaction does not proceed in the presence of water, a solute is recrystallized to obtain crystals of desired shape, size, or purity by adjusting the amount of water in the organic solution, or water produced as a by-product during the equilibrium reaction is removed from the reaction system to improve yield of the desired product.

An azeotropic evaporation method, in which an organic solvent that forms an azeotropic mixture with water is added to a feed solution and the feed solution is heated to remove the water and the added organic solvent, and a method of adding a desiccant which selectively adsorbs water to the feed solution are known as general dehydration methods.

However, the azeotropic evaporation method has problems such as deterioration of the quality of components in the feed solution due to heating. In the method of adding a desiccant to the feed solution, there are concerns that the solute in the feed solution is also adsorbed and that the added desiccant must be removed from the feed solution before the next step. Further, when the dehydration process is scaled up, there is a problem that obtaining reproducibility in dehydration is difficult.

A forward osmosis (FO) method, in which a solvent in a feed solution is separated by using the difference in osmotic pressure, is known as another useful dehydration method. The forward osmosis method is a method of concentrating a feed solution by bringing the feed solution into contact with a draw solution having a higher osmotic pressure than the feed solution via a forward osmosis (FO) membrane and causing the solvent to transfer from the feed solution to the draw solution. When the solvent is water, the aqueous solution can be dehydrated and concentrated using the forward osmosis method. The forward osmosis method does not require heating or pressurization. Therefore, it is expected that the forward osmosis method can prevent decomposition or degradation of a solute and process a solution while preserving the quality of the solute.

For example, PTL 1 discloses a method for dehydrating an aqueous alcohol solution by forward osmosis. In addition, PTL 2 discloses a system for treating a solution comprising an organic compound using a forward osmosis membrane which uses a polyketone as a membrane material, and a method for removing water from a hydrous material using the system.

CITATION LIST

Patent Literature

[PTL 1] WO 2010/080208
[PTL 2] WO 2016/024573

SUMMARY

Technical Problem

In the techniques described in PTL 1 and 2, removal of a small amount of water contained in an organic solution cannot be realized. In view of the above circumstances, one aspect of the present invention provides a method for dehydrating a feed solution that is an organic solution comprising a small amount of water without decomposing or degrading a solute contained in the organic solution.

Solution to Problem

Specifically, an example of the aspects embodying the present invention is as indicated below.

[1] A method for dehydrating a feed solution comprising a first organic solvent, water, and a first solute, comprising a dehydration step of bringing the feed solution into contact with an organic draw solution comprising a second organic solvent via a forward osmosis membrane to obtain a dehydrated feed solution which is dehydrated to a water content of less than 1% by mass, wherein an initial water content of the feed solution in the dehydration step is 1% by mass or greater and less than 30% by mass, and an initial water content of the organic draw solution is less than the initial water content of the feed solution.

[2] The method according to the above Aspect 1, wherein the forward osmosis membrane is a composite membrane constituted of a separation active layer and a microporous support membrane, a solubility parameter difference ΔHSP between the organic draw solution and the separation active layer is $\Delta HSP<16\ (MPa)^{0.5}$, and a saturation water content of the organic draw solution is 0.5% by mass or greater.

[3] The method according to the above Aspect 1 or 2, wherein solubility parameters of the organic draw solution are $13\ (MPa)^{0.5} \leq \delta d \leq 20\ (MPa)^{0.5}$, $2\ (MPa)^{0.5} \leq \delta p \leq 18\ (MPa)^{0.5}$, and $2\ (MPa)^{0.5} \leq \delta H \leq 28\ (MPa)^{0.5}$.

[4] The method according to any of the above Aspects 1 to 3, wherein the organic draw solution further comprises a second solute and/or a desiccant.

[5] The method according to any of the above Aspects 1 to 4, wherein the dehydration step is carried out in a dehydration apparatus comprising a feed solution system in which the feed solution is circulated; and a draw solution system in which the organic draw solution is circulated, and the feed solution system and the draw solution system are configured to suppress transfer of the first organic solvent and the second organic solvent to outside the systems due to vaporization.

[6] The method according to any of the above Aspects 1 to 5, wherein the second organic solvent is at least one selected from the group consisting of tetrahydrofuran, 2-methyl tetrahydrofuran, methyl acetate, ethyl acetate, propyl acetate, isopropyl acetate, butyl acetate, isobutyl acetate, toluene, cyclopentyl methyl ether, t-butyl methyl ether, acetonitrile, dimethylacetamide, N-methylpyrrolidone, hexafluoroisopropyl alcohol, acetic acid, acetone, anisole, benzene, chlorobenzene, carbon tetrachloride, chloroform, cumene, cyclohexane, 1,2-dichloroethane, 1,2-dichloroethene, dichloromethane, 1,2-dimethoxyethane, N,N-dimethylformamide, dimethyl sulfoxide, 1,4-dioxane, ethyl ether, ethyl formate, formamide, formic acid, heptane, hexane, methyl butyl ketone, methylcyclohexane, methyl ethyl ketone, methyl isobutyl ketone, pentane, nitromethane, pyridine, sulfolane, tetralin, 1,1,1-trichloroethane, 1,1,2-trichloroethene, and xylene.

[7] The method according to any of the Aspects 1 to 6, wherein in the dehydration step, the feed solution which has decreased in volume due to dehydration and concentration is replenished by an organic solution comprising the first organic solvent and having a water content of 0.5% by mass or less.

[8] The method according to any of the above Aspects 1 to 7, wherein the first solute in the dehydrated feed solution is subjected to a water-free reaction, in which the first solute and an additional reagent undergo a chemical reaction under anhydrous conditions.

[9] The method according to any of the above Aspects 1 to 8, wherein the method further comprises a crystallization step of purifying the first solute by crystallization.

[10] The method according to any of the Aspects 1 to 9, wherein the method further comprises a liquid separation step of extracting an organic layer from a solution comprising the first solute before the dehydration step, and the organic layer is used as the feed solution.

[11] The method according to any of the Aspects 1 to 10, wherein the method further comprises a regeneration step, and the regeneration step is a step of removing water which has transferred from the feed solution to the organic draw solution from the organic draw solution.

[12] The method according to the above Aspect 11, wherein in the regeneration step, a desiccant or a dehydration reagent is added into the organic draw solution.

[13] The method according to the above Aspect 11 or 12, wherein in the regeneration step, the organic draw solution is dehydrated by azeotropic distillation or membrane treatment.

[14] The method according to the above Aspects 1 to 13, wherein the method further comprises a crude dehydration step before the dehydrating step, and the crude dehydration step is a step of bringing a crude feed solution into contact with an aqueous draw solution comprising a third solute via a forward osmosis membrane to obtain a feed solution dehydrated to a water content of 1% by mass or greater and less than 30% by mass.

[15] The method according to the above Aspect 14, wherein the crude dehydration step is carried out in a dehydration apparatus comprising a feed solution system in which the crude feed solution is circulated; and a draw solution system in which the aqueous draw solution is circulated, and the feed solution system is configured to suppress transfer of the first organic solvent due to vaporization.

[16] The method according to the above Aspect 14 or 15, wherein in the crude dehydration step, the crude feed solution which has decreased in volume by dehydration and concentration is replenished by an organic solution comprising the first organic solvent and having a water content of 0.5% by mass or less.

[17] The method according to any of the above Aspects 1 to 16, wherein the method is used in manufacturing of pharmaceuticals.

Advantageous Effects of Invention

According to one aspect of the present invention, it is possible to dehydrate a feed solution that is an organic solution comprising a small amount of water and a solute under non-heating conditions, without decomposing or degrading the solute. The method according to one aspect of the present invention is suitably applicable, for example, for dehydrating an organic solution comprising a solute in the manufacturing of pharmaceuticals.

DESCRIPTION OF EMBODIMENTS

Hereinafter, embodiments for carrying out the present invention (hereinafter, also referred to as the present embodiment) will be described in detail using the drawings, which are non-limiting examples. Various features shown in the following embodiments can be combined with one another.

Overview of Method for Dehydrating Organic Feed Solution

Figure 1:
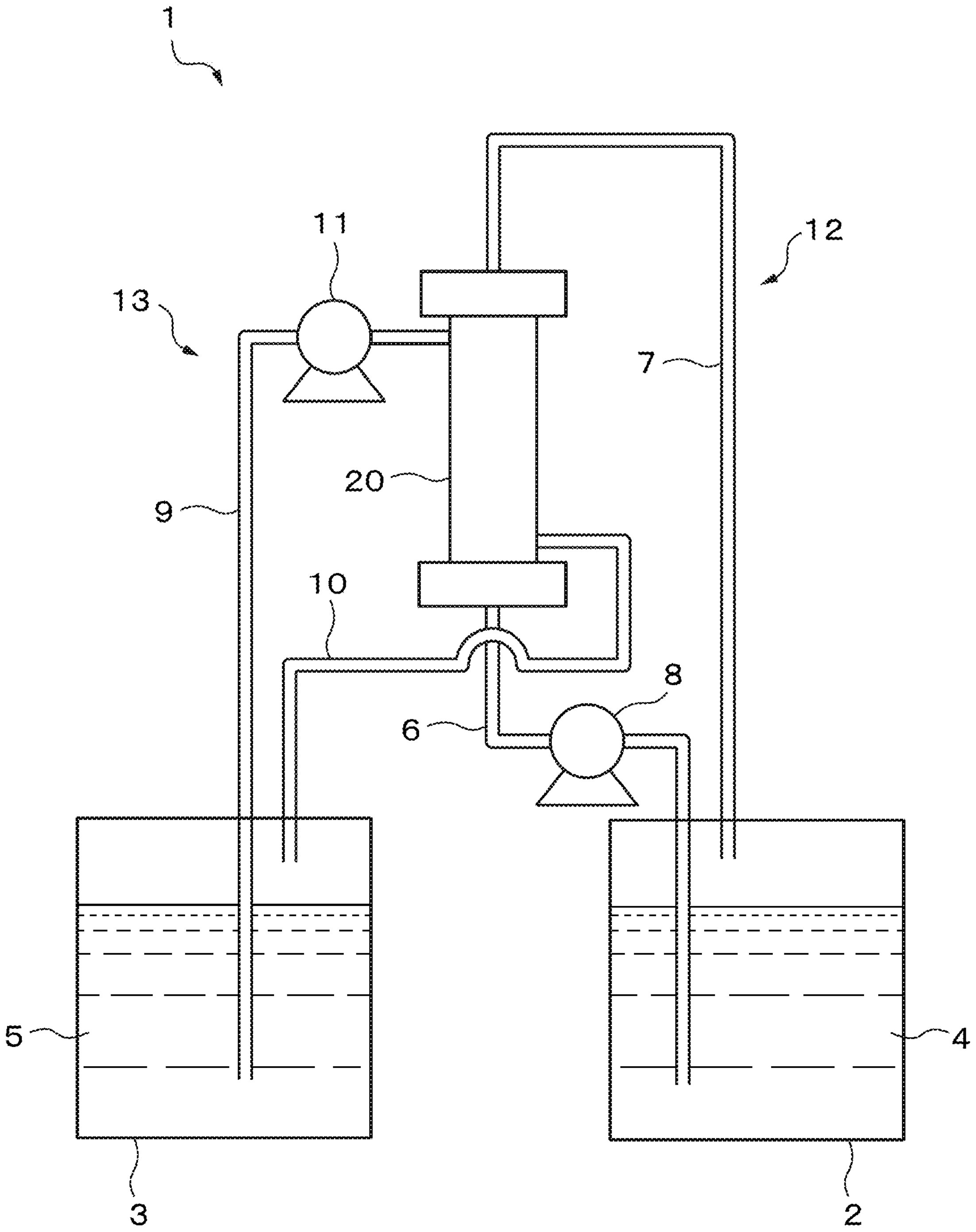
FIG. 1 is a conceptual diagram showing an example of a dehydration apparatus using the method according to the present invention.
Figure 2:
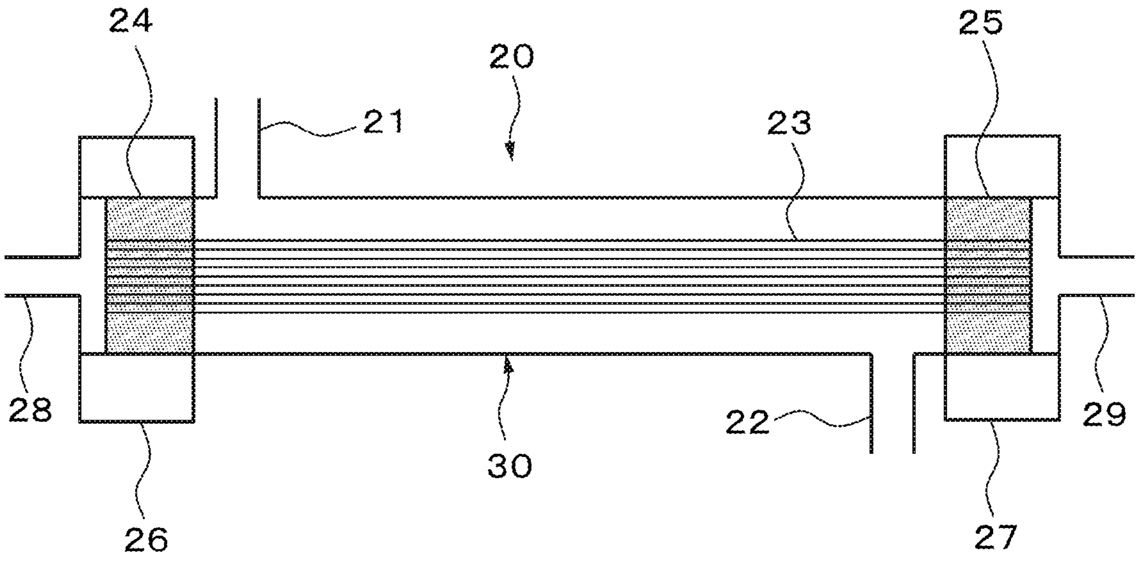
FIG. 2 is a cross-sectional diagram showing an example of a forward osmosis membrane module using the method according to the present invention.
Figure 3:
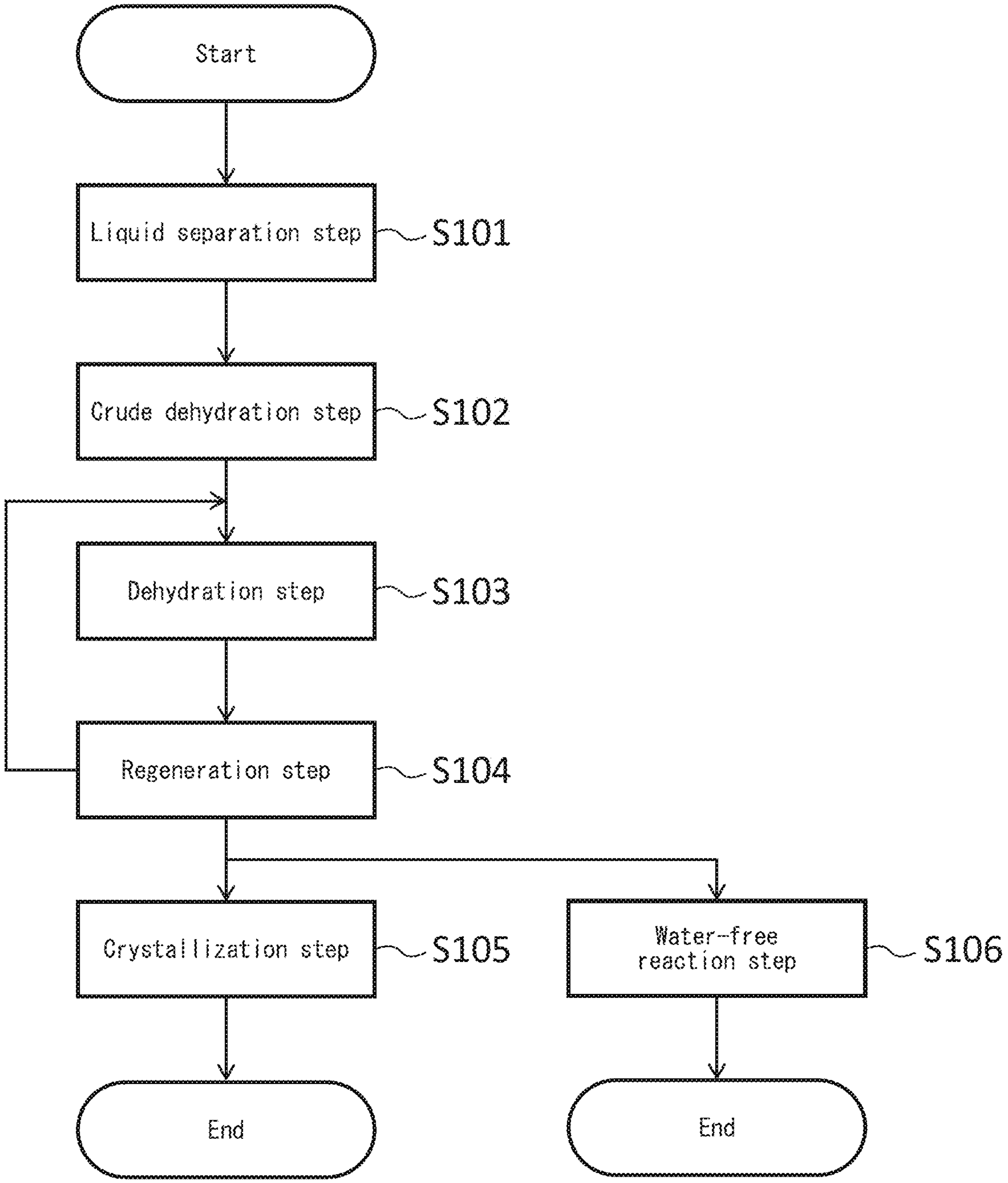
FIG. 3 is a flow chart representing a first embodiment of the method according to the present invention.
Figure 4:
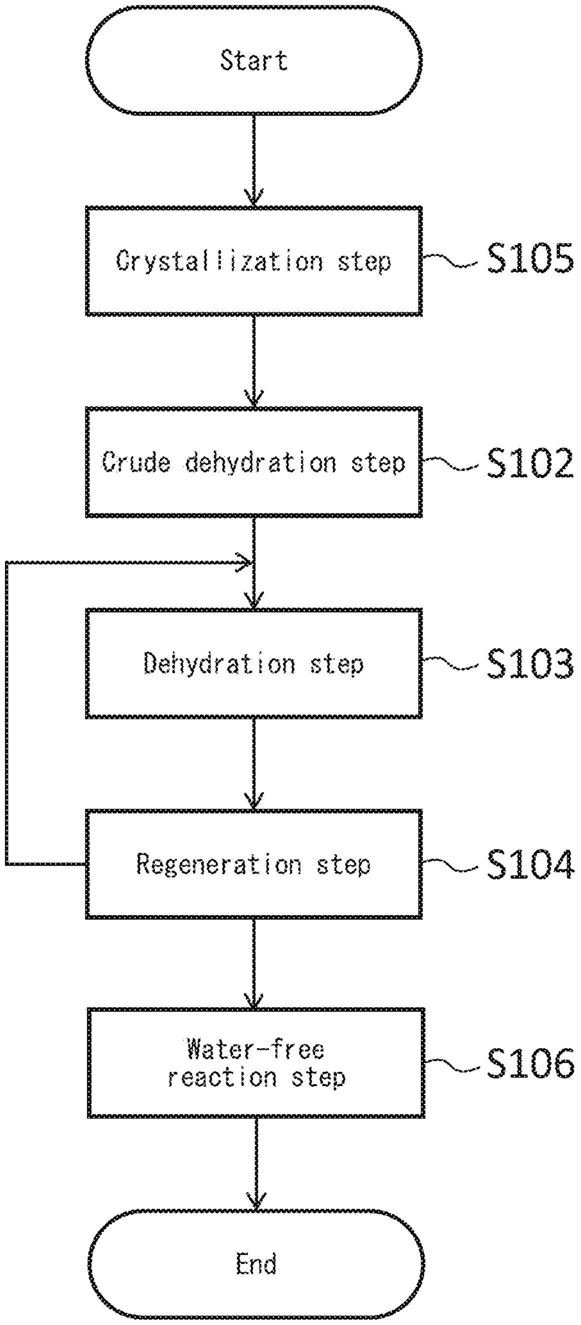
FIG. 4 is a flow chart representing a second embodiment of the method according to the present invention.

FIG. 1 is a conceptual diagram showing an example of a dehydration apparatus. FIG. 2 is a cross-sectional diagram showing an example of a forward osmosis membrane module. FIGS. 3 and 4 are flow charts for describing the procedures of the method of the present embodiment. With reference to FIGS. 1 to 4, the method of the present embodiment is a method for dehydrating a feed solution 4 comprising a first organic solvent, water, and a first solute. The method of the present embodiment is characterized as comprising a dehydration step S103 of bringing the feed solution 4 into contact with an organic draw solution 5 comprising a second organic solvent via a forward osmosis membrane 23 to obtain a dehydrated feed solution which is dehydrated to a water content of less than 1% by mass. The feed solution 4 may be, for example, an organic layer extracted from a solution comprising the first solute in a solution separation step S101 carried out before the dehydration step S103.

The method of the present embodiment has a step of removing water which has transferred from the feed solution 4 to the organic draw solution 5 from the organic draw solution 5, and may further comprise a regeneration step S104. The organic draw solution 5 from which water is removed in the regeneration step S104 is reused in the dehydration step S103 and used in the dehydration of the feed solution 4.

The dehydration step S103 may be carried out before a water-free reaction step S106, in which the first solute and an additional reagent undergo a chemical reaction under anhydrous conditions. The method of the present embodiment may further comprise a crystallization step S105 of purifying the first solute by crystallization. The crystallization step S105 may be carried out before the dehydration step S103, or may be carried out in place of the water-free reaction step S106 after the dehydration step S103. The dehydration step S103 may be carried out on a reaction solution of an equilibrium reaction. The equilibrium reaction may be a batch type (batch method) or a flow type (continuous method).

The method of the present embodiment may further comprise a crude dehydration step S102 before the dehydration step S103. Specifically, the crude dehydration step S102 is a step of bringing a crude feed solution into contact with a derive aqueous solution comprising a third solute via a forward osmosis membrane 23 to obtain the feed solution 4 of the present embodiment dehydrated to a water content of 1% by mass or greater and less than 30% by mass. The crude feed solution is, for example, an organic layer extracted in the liquid separation step S101 before the crude dehydration step S102.

Configuration of Dehydration Apparatus 1

With reference to FIGS. 1 to 4, an example of a configuration of the dehydration apparatus 1 for carrying out the dehydration step S103 will be described. The dehydration apparatus 1 is constituted of a feed solution system 12 and a draw solution system 13 in contact via a forward osmosis membrane module 20. Hereinafter, each component will be described.

<Forward Osmosis Membrane Module 20>

With reference to FIGS. 1 and 2, the forward osmosis membrane module 20 has a structure in which a hollow-fiber membrane bundle composed of a plurality of hollow-fiber forward osmosis membranes 23 is packed in a cylindrical housing 30, and both ends of the hollow-fiber membrane bundle are fixed to the housing 30 by adhesive fixing portions 24 and 25. On a side surface of the housing 30 are provided shell-side conduits 21 and 22, and on the ends are provided headers 26 and 27. The adhesive fixing portions 24 and 25 are each fixed so that the hollow portions of the hollow fibers are not sealed.

The headers 26 and 27 have core-side conduits 28 and 29, respectively, which communicate with the hollow portions inside the hollow-fiber forward osmosis membranes 23 and do not communicate with the outside of the forward osmosis membranes 23. A solution can be introduced to the insides of the forward osmosis membranes 23 and the introduced solution can be drained from the insides of the forward osmosis membranes 23 through the core-side conduits 28 and 29. The shell-side conduits 21 and 22 each communicate with the outside of the forward osmosis membranes 23 and do not communicate with the insides of the forward osmosis membranes 23. A solution can be introduced to the outside of the forward osmosis membranes 23 and the introduced solution can be drained from the outside of the forward osmosis membranes 23 through the shell-side conduits 21 and 22.

<Feed Solution System 12>

As shown in FIG. 1, the feed solution system 12 comprises a feed solution tank 2, feed solution delivery pipes 6 and 7, and a feed solution delivery pump 8. The feed solution 2 is filled with a feed solution 4, and the feed solution 4 is circulated in the feed solution system 12. Specifically, the feed solution 4 passes through the feed solution delivery pipe 6 by means of the feed solution delivery pump 8 and enters the forward osmosis membrane module 20 from the core-side conduit 28. The feed solution 4 is discharged from the core-side conduit 29 after passing through the insides of the forward osmosis membranes 23, and returns to the feed solution tank 2 through the feed solution delivery pipe 7.

<Draw Solution System 13>

The draw solution system 13 comprises a draw solution tank 3, draw solution delivery pipes 9 and 10, and a draw solution delivery pump 11. The draw solution tank 3 is filled with an organic draw solution 5, and the organic draw solution 5 is circulated in the draw solution system 13. Specifically, the organic draw solution 5 passes through the draw solution delivery pipe 9 by means of the draw solution delivery pump 11 and enters the forward osmosis membrane module 20 from the shell-side conduit 21. The organic draw solution 5 is discharged from shell-side conduit 22 after passing through the outside of the forward osmosis membranes 23, and returns to the draw solution tank 3 through the draw solution delivery pipe 10.

The feed solution 4 and the organic draw solution 5 are in contact via the walls of the hollow-fiber forward osmosis membranes 23, but are not directly mixed with each other. When the feed solution 4 and the organic draw solution 5 are in contact via the walls of the forward osmosis membranes 23, water in the feed solution 4 transfers to the organic draw solution 5 through the forward osmosis membranes 23, and the feed solution 4 is dehydrated. The flow direction of the feed solution 4 and the organic draw solution 5 in the forward osmosis membrane module 20 may be concurrent through the walls of the forward osmosis membranes 23, or may be countercurrent through the walls of the forward osmosis membranes 23.

The feed solution system 12 and the draw solution system 13 are preferably configured so as to suppress transfer of the first and second organic solvents to outside the systems due to vaporization. Specifically, each component of the feed solution 12 and the draw solution system 13 is preferably configured so that gas does not leak from the feed solution tank 2 and the draw solution tank 3. For example, the feed solution tank 2 and the draw solution tank 3 may be covered, or condensers may be installed to condense and return organic solvents to the tanks. Note that, a safety valve and/or a back pressure valve may be incorporated into the feed solution system 12 and the draw solution system 13 so that the respective internal pressures can be regulated. By preventing the volatilization of the first and second organic solvents, an increase in water content of the feed solution 4 and the organic draw solution 5 can be prevented, and dehydration can be efficiently carried out.

<Forward Osmosis Membrane 23>

Any membrane having the properties of a semipermeable membrane that allows water to pass through can be used as the forward osmosis membrane 23. The forward osmosis membrane 23 is preferably a composite membrane having a separation active layer on a support layer (support membrane) from the viewpoint of ensuring high membrane strength. The support membrane may be a flat membrane or a hollow-fiber membrane. When the support membrane is a flat membrane, one or both surfaces of the support membrane may have a separation active layer. When the support membrane is a hollow-fiber membrane, the exterior surface, the interior surface, or both surfaces of the hollow-fiber membrane may have a separation active layer thereon.

Modularizing the forward osmosis membranes 23 as described above is useful. The forward osmosis membrane module 20 can be, for example, a pleated module or a spiral module when the forward osmosis membranes are flat membranes, and can be, for example, a hollow-fiber membrane module in which a bundle of hollow-fiber membranes is packed in a cylinder when the forward osmosis membranes are the hollow-fiber membranes. The forward osmosis membrane module 20 is preferably a module in which a bundle of hollow-fiber membranes as the forward osmosis membranes 23 is packed in a cylinder.

The support membrane is preferably a microporous hollow-fiber support membrane. The microporous hollow-fiber support membrane has, on the inner surface thereof, micropores having a pore size of preferably 0.001 μm or more and 2 μm or less, and more preferably 0.001 μm or more and 0.2 μm or less. As the material of the microporous hollow-fiber support membrane, any material used for ultrafiltration membranes or microfiltration membranes may be used. Specific examples of the hollow-fiber support membrane material include polysulfone, polyethersulfone, polyvinylidene fluoride, polyacrylonitrile, polyethylene, polypropylene, cellulosic polymer, polybenzimidazole, polyketone, polyamide, polyimide, polyetheretherketone, and crosslinked products thereof. The material preferably includes at least one selected therefrom and/or has one selected therefrom as the main component (i.e., component having the highest content ratio). The material of the hollow-fiber support membrane more preferably includes at least one selected from polysulfone, polyethersulfone, polyketone, polyamide, polyimide, and crosslinked products thereof and/or has one selected therefrom as the main component, and is even more preferably polyketone.

As the separation active layer, for example, at least one polymer selected from polysulfone, polyethersulfone, polyvinylidene fluoride, polyacrylonitrile, polyethylene, polypropylene, polyamide, polyimide, and cellulose acetate is contained and/or a thin film layer in which one selected therefrom as the main component is suitably used. These polymers may be crosslinked or may not be crosslinked. When the separation active layer is a crosslinked polymer, the crosslinking may be of any degree. In consideration of dehydration efficiency of the feed solution 4 and ease of formation on the support layer, the separation active layer is preferably a layer of polyamide, and one or more selected from non-crosslinked polyamide and crosslinked polyamide may be used. The polyamide constituting the separation active layer can be formed by, for example, interfacial polymerization of a polyfunctional aromatic acid halide and a polyfunctional aromatic amine.

The polyfunctional aromatic acid halide refers to an aromatic acid halide compound having two or more acid halide groups per molecule. Specific examples thereof can include trimesic acid halide, trimellitic acid halide, phthalic acid halide, isophthalic acid halide, terephthalic acid halide, pyromellitic acid halide, benzophenonetetracarboxylic acid halide, biphenyldicarboxylic acid halide, naphthalenedicarboxylic acid halide, pyridinedicarboxylic acid halide, and benzenedisulfonic acid halide. One or a mixture of two or more thereof can be used. Particularly in the present invention, trimesic acid chloride alone, a mixture of trimesic acid chloride and isophthalic acid chloride, or a mixture of trimesic acid chloride and terephthalic acid chloride is preferably used.

The polyfunctional aromatic amine refers to an aromatic amine compound having two or more amine groups per molecule. Specific examples thereof can include m-phenylenediamine, p-phenylenediamine, 3,3'-diaminodiphenylmethane, 4,4'-diaminodiphenylamine, 4,4'-diaminodiphenyl ether, 3,4'-diaminodiphenyl ether, 3,3'-diaminodiphenylamine, 3,5'-diaminobenzoic acid, 4,4'-diaminodiphenylsulfone, 3,3'-diaminodiphenylsulfone, 3,4'-diaminodiphenylsulfone, 1,3,5-triaminobenzene, and 1,5-diaminonaphthalene. One or a mixture of two or more thereof can be used. Particularly in the present embodiment, one or more selected from m-phenylenediamine and p-phenylenediamine are suitably used.

<Feed Solution 4>

The feed solution 4 is an organic solution comprising a first organic solvent, water, and a first solute. The initial water content of the feed solution 4 in the dehydration step S103 is 1% by mass or greater and less than 30% by mass, and is preferably 1% by mass or greater and less than 20% by mass, and more preferably 1% by mass or greater and less than 15% by mass. The "initial water content" as described herein refers to the water content of the feed solution 4 or the organic draw solution 5, at the time of preparing the feed solution 4 in the feed solution tank 2 or at the time of preparing the organic draw solution 5 in the draw solution tank 3, and is the same hereinafter. The method for measuring water content will be described below.

The first organic solvent may be an ether (for example, a cyclic ether), an ester, a hydrocarbon, a nitrogen-containing compound, a sulfur-containing compound, a halogen compound, or a ketone, and is specifically at least one selected from the group consisting of tetrahydrofuran, 2-methyltetrahydrofuran, methyl acetate, ethyl acetate, propyl acetate, isopropyl acetate, butyl acetate, isobutyl acetate, toluene, cyclopentyl methyl ether, t-butyl methyl ether, acetonitrile, dimethylacetamide, N-methylpyrrolidone, hexafluoroisopropyl alcohol, acetic acid, acetone, anisole, benzene, chlorobenzene, carbon tetrachloride, chloroform, cumene, cyclohexane, 1,2-dichloroethane, 1,2-dichloroethene, dichloromethane, 1,2-dimethoxyethane, N,N-dimethylformamide, dimethylsulfoxide, 1,4-dioxane, ethyl ether, ethyl formate, formamide, formic acid, heptane, hexane, methyl butyl ketone, methyl cyclohexane, methyl ethyl ketone, methyl isobutyl ketone, pentane, nitromethane, pyridine, sulfolane, tetralin, 1,1,1-trichloroethane, 1,1,2-trichloroethene, and xylene. The first organic solvent is preferably at least one selected from the group consisting of tetrahydrofuran, 2-methyltetrahydrofuran, ethyl acetate, isopropyl acetate, toluene, cyclopentyl methyl ether, and t-butyl methyl ether; more preferably at least one selected from the group consisting of tetrahydrofuran, ethyl acetate, isopropyl acetate, toluene, and t-butyl methyl ether; and even more preferably at least one selected from the group consisting of tetrahydrofuran, ethyl acetate, and isopropyl acetate.

The first solute is not limited to a specific type as long as the solute does not pass through the forward osmosis membranes 23. The method of the present embodiment is used in manufacturing of pharmaceuticals in one aspect. The first solute includes, for example, feedstocks (for example, amino acids such as phenylalanine, saccharides such as sucrose, natural products such as alkaloids isolated from nature such as quinine, and compounds referred to as building blocks), intermediate compounds (for example, compounds chemically synthesized and modified from feedstocks such as octaacetyl sucrose), or final compounds (for example, bulk drugs) used in the pharmaceutical industry (for example, low-molecular-weight pharmaceutical products; medium-molecular-weight pharmaceutical products such as peptides and nucleic acids; high-molecular-weight pharmaceutical products such as proteins; vaccine; and antibiotics). The solute may be a solid or a liquid, or may be a mixture of a plurality of substances. Note that, the first organic solvent and the first solute are selected so as to be different substances.

The molecular weight of the first solute, from the viewpoint of preventing the first solute from permeating the forward osmosis membranes 23 and preventing the first solute from adhering to the forward osmosis membranes 23, is preferably 100 or greater and 30000 or less, more preferably 150 or greater and 10000 or less, and even more preferably 200 or greater and 1000 or less. Note that, the above molecular weight refers to, when a valuable substance is a polymer, the number average molecular weight in terms of polyethylene oxide measured by gel permeation chromatography, and when not a polymer, a value based on atomic weight. The concentration of the solute is not particularly limited, and may be appropriately selected within a range where the solute is soluble in the first organic solvent. Specifically, the concentration of the solute relative to the total mass of the feed solution 4 is, for example, 0.1% by mass or greater and 60% by mass or less, preferably 1% by mass or greater and 50% by mass or less, and more preferably 5% by mass or greater and 40% by mass or less. By having the first solute at or above a predetermined concentration, it is possible to increase the amount of solute processible at one time in the dehydration apparatus 1 and improve processing efficiency. By having the first solute at or below a predetermined concentration, it is possible to circulate the feed solution 4 in the dehydration apparatus 1 without precipitating the first solute.

<Organic Draw Solution 5>

The organic draw solution 5 comprises a second organic solvent. The second organic solvent is an organic solvent which does not permeate the forward osmosis membranes 23. Since the organic draw solution 5 is not an aqueous solution and is an organic solution comprising a second organic solution which does not permeate the forward osmosis membranes 23, diffusion of water from the organic draw solution 5 to the feed solution 4 can be prevented, and the feed solution 4 comprising a small amount of water can be effectively dehydrated.

The solubility parameter difference ΔHSP between the organic draw solution 5 and the separation active layer of the forward osmosis membranes 23 is preferably ΔHSP<16 $(MPa)^{0.5}$. It is considered that when the organic draw solution and the separation active layer satisfy this condition, the separation active layer swells appropriately and water permeation paths increase, allowing for suitable dehydration. The ΔHSP is more preferably 15 $(MPa)^{0.5}$ or less, 14 $(MPa)^{0.5}$ or less, or 13 $(MPa)^{0.5}$ or less. It is preferable that the ΔHSP be small, but from the viewpoint of facilitating selection of the combination of organic draw solution and separation active layer, the ΔHSP may be 5 $(MPa)^{0.5}$ or more, 6 $(MPa)^{0.5}$ or more, or 7 $(MPa)^{0.5}$ or more in one aspect.

The solubility parameter of the present disclosure is the Hansen solubility parameter (HSP). Based on the dispersion term δd, the polarity term δp, and the hydrogen bonding term δH of the HSP, the solubility parameter difference ΔHSP between two substances can be calculated by the following formula.

$$\Delta HSP = \sqrt{4(\delta d2 - \delta d1)^2 + (\delta d2 - \delta p1)^2 + (\delta H2 - \delta H1)^2} \quad \text{[Math. 1]}$$

Regarding the HSP value of the separation active layer, the chemical structure of the polymer constituting the separation active layer is converted into a monomer according to the procedure indicated below. The monomer HSP is calculated using the Hansen SP & QSPR model, an add-on to the commercially available software Winmostar 9.4.11, and this value can be taken as the HSP of the separation active layer. For example, when the polymer has a linear structure and is a non-crosslinked polymer having no branched chains, after repeating units of the polymer are removed and the bond portion between the repeating units is replaced with a methyl group, the monomer HSP is calculated. On the other hand, when the polymer is a crosslinked polymer having branched chains, after repeating units are removed and each functional group that may have remained unreacted without crosslinking other than a polymer terminal is replaced with a hydrogen group to be converted to a linear-structure polymer and repeating units, the bond portion between the converted repeating units is replaced with a methyl group, and the monomer HSP is calculated. The specific procedure will be described below.

Regarding the HSP value of the organic draw solution, the HSP value of the whole organic draw solution can be determined from the HSP of each of n liquid components (components 1, 2, . . . n) contained in the organic draw solution and volume fractions in the organic draw solution. Specifically, the HSP value of the organic draw solution is calculated according to the following formula. Solid components contained in the organic draw solution are not considered in the calculation of the HSP value.

$$V1+V2+\ldots+Vn=1$$

$$\delta d=\delta d1\times V1+\delta d2\times V2+\ldots+\delta dn\times Vn$$

$$\delta p=\delta p1\times V1+\delta p2\times V2+\ldots+\delta pn\times Vn$$

$$\delta H=\delta H1\times V1+\delta H2\times V2+\ldots+\delta Hn\times Vn \quad \text{[Math2]}$$

wherein

V1, V2, . . . Vn are volume fractions for components 1, 2, . . . n, respectively;

δd1, δd2, . . . δdn are HSP dispersion terms for components 1, 2, . . . n, respectively;

δp1, δp2, . . . δpn are HSP polarity terms for components 1, 2, . . . n, respectively; and δH1, δH2, . . . δH are HSP hydrogen bonding terms for components 1, 2, . . . n, respectively.

The HSP value of each liquid component of the organic draw solution can be calculated using the Hansen SP & QSPR model, an add-on to the commercially available software Winmostar 9.4.11.

The solubility parameter (HSP) value of the separation active layer is preferably 15 $(MPa)^{0.5}$ or more, 16 $(MPa)^{0.5}$ or more, or 17 $(MPa)^{0.5}$ or more, and is preferably 40 $(MPa)^{0.5}$ or less, 39 $(MPa)^{0.5}$ or less, or 38 $(MPa)^{0.5}$ or less.

The solubility parameter (HSP) value of the organic draw solution is preferably 13 $(MPa)^{0.5}$ or more, 14 $(MPa)^{0.5}$ or more, or 15 $(MPa)^{0.5}$ or more, and is preferably 39 $(MPa)^{0.5}$ or less, 38 $(MPa)^{0.5}$ or less, or 37 $(MPa)^{0.5}$ or less.

In the solubility parameters of the separation active layer, δd is preferably 15 $(MPa)^{0.5}$ or more, 16 $(MPa)^{0.5}$ or more, or 17 $(MPa)^{0.5}$ or more, and is preferably 26 $(MPa)^{0.5}$ or less, 25 $(MPa)^{0.5}$ or less, or 24 $(MPa)^{0.5}$ or less; δp is preferably 2 $(MPa)^{0.5}$ or more, 3 $(MPa)^{0.5}$ or more, or 4 $(MPa)^{0.5}$ or more, and is preferably 26 $(MPa)^{0.5}$ or less, 25 $(MPa)^{0.5}$ or less, or 24 $(MPa)^{0.5}$ or less; and δH is preferably 1 $(MPa)^{0.5}$ or more, 2 $(MPa)^{0.5}$ or more, or 3 $(MPa)^{0.5}$ or more, and is preferably 20 $(MPa)^{0.5}$ or less, 19 $(MPa)^{0.5}$ or less, or 18 $(MPa)^{0.5}$ or less.

In the solubility parameters of the organic draw solution, δd is preferably 13 $(MPa)^{0.5}$ or more, 14 $(MPa)^{0.5}$ or more, or 15 $(MPa)^{0.5}$ or more, and is preferably 20 $(MPa)^{0.5}$ or less, 19 $(MPa)^{0.5}$ or less, or 18 $(MPa)^{0.5}$ or less; δp is preferably 2 $(MPa)^{0.5}$ or more, 3 $(MPa)^{0.5}$ or more, or 4 $(MPa)^{0.5}$ or more, and is preferably 18 $(MPa)^{0.5}$ or less, 17 $(MPa)^{0.5}$ or less, or 16 $(MPa)^{0.5}$ or less; and γH is preferably 2 $(MPa)^{0.5}$ or more, 3 $(MPa)^{0.5}$ or more, or 4 $(MPa)^{0.5}$ or more, and is preferably 28 $(MPa)^{0.5}$ or less, 27 $(MPa)^{0.5}$ or less, or 26 $(MPa)^{0.5}$ or less.

The organic draw solution is preferably 0.5% by mass or greater, 1.0% by mass or greater, or 2.0% by mass or greater of the saturation water content. It is considered that when the organic draw solution satisfies this condition, water can suitably transfer from the feed solution to the organic draw solution. The saturation water content, although preferably at 100% (i.e., arbitrarily miscible with water), may be, for example, 99% by mass or less, 98% by mass or less, or 97% by mass or less from the viewpoint of dehydration efficiency.

The saturation water content of the organic draw solution can be determined by the following procedure. Equal parts by weight of water and the organic draw solution are mixed using a separation funnel. If the mixture cannot be separated into two layers—a water layer and an organic layer, the organic draw solution is considered miscible with water at any ratio. If the mixture is separated into two layers, liquid separation is carried out, and the water content of the resulting organic layer is regarded as the saturation water content. A method for measuring water content will be described below.

When the saturation water content of the organic draw solution is unknown and the organic draw solution comprises a solvent arbitrarily miscible with water, by using the amount (g) of water added just before the organic draw solution becomes two phases when water is gradually added to the organic draw solution and the amount (g) of organic draw solution, the water content obtained by the following formula is defined as the saturation water content.

$$\text{Saturation water content (\%)} = 100 \times \frac{\text{amount of water added just before 2 phases (g)}}{\text{amount of organic draw solution (g)} + \text{amount of water added (g)}} \quad \text{[Math. 3]}$$

Based on the feed solution (FS) water content and the feed solution (FS) amount, the dehydration efficiency can be calculated based on the following formula. Note that it is preferable to select about ⅛ to ¼ of the total operation time for t min below. From the dehydration efficiency at the start of operation, the degree of dehydration after operation has ended can be estimated.

$$\text{Dehydration efficiency (\%)} = 100 \times \left(1 - \frac{(FS\ \text{water content after}\ t\ \text{min (\%)}) \times (FS\ \text{amount after}\ t\ \text{min (g)})}{(FS\ \text{water content after 0 min (\%)}) \times (FS\ \text{amount after 0 min (g)})}\right) \quad \text{[Math. 4]}$$

For example, when the first solute and/or the second solute precipitates during operation, the dehydration efficiency is modified as follows. When precipitation of a solute is confirmed, the operation is halted and the total weight (A) of the feed solution is measured, followed by measuring the water content of the supernatant solution. This water content is used as the water content of the feed solution (FS) after t min. In addition, the precipitated solute is separated by filtration, and the precipitated weight (B) is measured. The weight (A)-(B) is used as the feed solution (FS) amount after t min.

The second organic solvent may be an ether (for example, a cyclic ether), an ester, a hydrocarbon, a nitrogen-containing compound, a sulfur-containing compound, a halogen compound, a ketone, or an alcohol, and is specifically at least one selected from the group consisting of tetrahydrofuran, 2-methyltetrahydrofuran, methyl acetate, ethyl acetate, propyl acetate, isopropyl acetate, butyl acetate, isobutyl acetate, toluene, cyclopentyl methyl ether, t-butyl methyl ether, acetonitrile, dimethylacetamide, N-methylpyrrolidone, hexafluoroisopropyl alcohol, acetic acid, acetone, anisole, benzene, chlorobenzene, carbon tetrachloride, chloroform, cumene, cyclohexane, 1,2-dichloroethane, 1,2-dichloroethene, dichloromethane, 1,2-dimethoxy ethane, N,N-dimethylformamide, dimethylsulfoxide, 1,4-dioxane, ethyl ether, ethyl formate, formamide, formic acid, heptane, hexane, methyl butyl ketone, methyl cyclohexane, methyl ethyl ketone, methyl isobutyl ketone, pentane, nitromethane, pyridine, sulfolane, tetralin, 1,1,1-trichloroethane, 1,1,2-trichloroethene, xylene, methanol, ethanol, and isopropyl alcohol. The second organic solvent is preferably at least one selected from the group consisting of tetrahydrofuran, 2-methyltetrahydrofuran, ethyl acetate, isopropyl acetate, toluene, cyclopentyl methyl ether, and t-butyl methyl ether; more preferably at least one selected from the group consisting of tetrahydrofuran, ethyl acetate, isopropyl acetate, toluene, and t-butyl methyl ether; and even more preferably at least one selected from the group consisting of tetrahydrofuran, ethyl acetate, and isopropyl acetate.

The first organic solvent and the second organic solvent may be the same as or different from each other.

The initial water content of the organic draw solution 5 in the dehydration step S103 is less than the initial water content of the feed solution 4. When the organic draw solution 5 comprises the second solute and/or a desiccant, the initial water content of the organic draw solution 5 is measured with the second solute and/or the desiccant added. Note that, in the organic draw solution 5 comprising a desiccant, a portion other than the desiccant (specifically, the supernatant portion) is sampled to measure the water content. However, when the organic draw solution 5 comprises a dehydration reagent as the second solute, the water content before adding the dehydration reagent, i.e., of a liquid lacking a dehydration reagent among the components of the organic draw solution (second organic solvent in one aspect) is taken as the water content of the organic draw solution 5. Since the forward osmosis membrane is a semipermeable membrane which permeates water, it is considered that water transfers from the side of the feed solution 4 having many water molecules to the side of the organic draw solution 5 having few water molecules due to a diffusion phenomenon. As a result, it is possible to remove the small amount of water contained in the feed solution 4, which is an organic solution. The difference between the initial water content (% by mass) of the organic draw solution 5 in the dehydration step S103 and the initial water content (% by mass) of the feed solution 4 may be 0.5% by mass or greater, 0.7% by mass or greater, or 1% by mass or greater in one aspect, and may be 20% by mass or less, 15% by mass or less, or 10% by mass or less in one aspect.

The organic draw solution 5 may further comprise a second solute and/or a desiccant. The second solute is dissolved in the second organic solvent or completely mixed into the second organic solvent, and is a substance that does not permeate the forward osmosis membrane. The second solute at a concentration thereof in the organic draw solution 5 is preferably at least partially dissolved in or completely mixed into the second organic solvent. The desiccant removes water by physically adsorbing water in a solution, or removes water by taking in water as crystallization water. The desiccant may be a substance soluble or insoluble in the organic draw solution 5. In one aspect, the desiccant is a substance which remains in a solid state at 20° C. in the organic draw solution 5 comprising the second organic solvent, and more typically a substance that does not dissolve in the second organic solvent. The desiccant can remove water which has permeated the forward osmosis membrane 23 from the feed solution 4 from the organic draw solution 5, and the feed solution 4 can be dehydrated more efficiently.

Specific examples of the second solute include: branched monoalcohols having 3 carbon atoms, such as 2-propanol, 2-butanol, and 2-methyl-2-propanol, and branched monoalcohols having 4 or more carbon atoms; non-polar solvents such as toluene; polymers such as polyethylene glycol and polypropylene glycol; dehydration reagents such as ortho esters, sodium, calcium hydride, and phosphorus pentoxide; and organic acids such as p-toluenesulfonic acid and pyridinium p-toluenesulfonate. The dehydration reagent removes water by chemically reacting with water in the solution, and is distinguished from the above desiccant, which does not involve a chemical reaction during dehydration. The ortho ester may be, for example, trimethyl orthoformate and triethyl orthoformate. Note that, the second organic solvent and the second solute are selected from different substances.

The second solute is preferably one or more selected from: ortho ester-based dehydration reagent such as trimethyl orthoformate and triethyl orthoformate; and compounds having a toluene structure such as toluene, p-toluenesulfonate, and pyridinium p-toluenesulfonate; more preferably one or more selected from trimethyl orthoformate, triethyl orthoformate, p-toluenesulfonate, and pyridinium p-toluenesulfonate; and even more preferably triethyl orthoformate and p-toluenesulfonate, or pyridinium p-toluenesulfonate. By including a second solute in the organic draw solution 5, it is considered that the osmotic pressure of the organic draw solution 5 can be increased and the dehydration effect of the feed solution 4 can be enhanced. A compound having a hydrophobic structure such as a toluene structure can have a satisfactory effect of increasing osmotic pressure of the organic draw solution 5 due to the contribution of the hydrophobic structure.

The concentration of the second solute contained in the organic draw solution 5, in one aspect, may be 0.01% by mass or greater, 0.1% by mass or greater, or 1% by mass or greater, and in one aspect, may be 60% by mass or less, 50% by mass or less, 40% by mass or less, 30% by mass or less, 20% by mass or less, or 10% by mass or less. The concentration of a polymer, such as polyethylene glycol or polypropylene glycol, contained in the organic draw solution 5 relative to the total mass of the organic draw solution 5 is preferably 0.1% by mass or greater and 60% by mass or less, and more preferably 0.5% by mass or greater and 50% by mass or less. By setting the concentration of the polymer to or above a predetermined value, the osmotic pressure of the organic draw solution 5 can be further increased, and by setting the concentration to or below a predetermined value, the organic draw solution 5 may be of a suitable viscosity for circulation in the dehydration apparatus 1. The concentration of the ortho ester-based dehydration reagent contained in the organic draw solution 5 relative to the total mass of the organic draw solution 5 is preferably 1% by mass or greater and 60% by mass or less, and more preferably 5% by mass or greater and 40% by mass or less. By setting the concentration of the ortho ester-based dehydration reagent to or above a predetermined value, water which has transferred from the feed solution 4 to the organic draw solution 5 can be satisfactorily removed, and by setting the concentration to or below a predetermined value, degradation of the forward osmosis membrane 23 due to heat of reaction of the dehydration reagent can be prevented. The amount of organic acid contained in the organic draw solution 5 may be a catalytic amount, and is preferably 0.01% by mass or greater and 10% by mass or less relative to the total mass of the organic draw solution 5, and more preferably 0.1% by mass or greater and 5% by mass or less.

Examples of the desiccant include desiccants which are generally used in dehydration of an organic solvent, for example, porous materials such as silica gel and molecular sieves, and hydrate-forming compounds such as sodium sulfate and magnesium sulfate. The desiccant is preferably one or more selected from the group consisting of molecular sieves and magnesium sulfate, and is more preferably molecular sieves. The amount of desiccant contained in the organic draw solution 5 relative to the total mass of the organic draw solution 5 is preferably 1% by mass or greater and 60% by mass or less, and more preferable 5% by mass or greater and 50% by mass or less. By setting the amount of desiccant to or above a predetermined value, water which has transferred from the feed solution 4 to the organic draw solution 5 can be satisfactorily removed, and by setting the amount to or below a predetermined value, pressure loss at an interior portion of the draw solution tank 3 can be decreased.

Method According to First Embodiment

The method according to the first embodiment will be described with reference to FIG. 3. This method assumes a procedure in, for example, the manufacturing of pharmaceuticals, in which a water-containing organic layer is extracted by liquid separation, dehydrated to a desired water content, and then subjected to crystallization or a water-free reaction.

In the liquid separation step S101 in FIG. 3, an organic solution comprising a first solute, which is a product of a chemical reaction, is extracted by a liquid separation operation. The organic solution extracted by the liquid separation operation contains water, and is thus dehydrated in the crude dehydration step S102 and the dehydration step S103. When the water content of the organic solvent is 1% by mass or greater and less than 30% by mass, preferably 1% by mass or greater and less than 20% by mass, and more preferably 1% by mass or greater and less than 15% by mass, the crude dehydration step S102 may be omitted to carry out the dehydration step S103.

In the crude dehydration step S102 in FIG. 3, a crude feed solution, which is an organic solution extracted in the liquid separation step S101, and an aqueous draw solution comprising a third solute are brought in contact via the forward osmosis membrane 23 to obtain a feed solution 4 dehydrated to a water content of 1% by mass or greater and less than 30% by mass. By dehydrating to a certain degree using a water-based aqueous draw solution that is more difficult to evaporate than an organic solvent and can be easily handled, the time for the dehydration step S103 can be shortened.

The third solute may be, for example, one or more selected from the group consisting of halides, nitrates, sulfates, acetates, urea, alcohols, glycols, polymers, and saccharides. Specific examples thereof may be one or more selected from the group consisting of sodium chloride, potassium chloride, magnesium chloride, ammonium chloride, potassium nitrate, ammonium nitrate, sodium sulfate, magnesium sulfate, ammonium sulfate, sodium acetate, potassium acetate, methanol, ethanol, 1-propanol, 2-propanol, ethylene glycol, propylene glycol, polyethylene glycol, and polypropylene glycol.

The crude dehydration step S102 is carried out in a dehydration apparatus 1 comprising a feed solution system 12 in which a crude feed solution is circulated and a draw solution system 13 in which an aqueous draw solution is circulated. The feed solution system 12 is configured to suppress transfer of the first organic solvent to outside the system due to vaporization. By preventing volatilization of the first organic solvent, an increase in water content of the feed solution 4 can be prevented.

In the crude dehydration step S102, the crude feed solution which has decreased in volume due to dehydration and concentration is preferably replenished by an organic solution comprising the first organic solvent and having a water content of 0.5% by mass or less. By replenishing the feed solution 4 which has decreased in volume with an organic solution, water content in the feed solution 4 can be further decreased. The water content of the above organic solution may be 0.4% by mass or less or 0.3% by mass or less, and from the viewpoint of availability of the organic solution, may be 0.001% by mass or greater, 0.01% by mass or greater, or 0.1% by mass or greater.

In the dehydration step S103 in FIG. 3, there are first prepared a feed solution 4, which is an organic solution subjected to crude dehydration in the crude dehydration step S102, and an organic draw solution 5 comprising a second organic solvent and having a lower water content than the feed solution 4. The feed solution 4 and the organic draw solution 5 are then brought into contact via a forward osmosis membrane 23 to obtain a dehydrated feed solution dehydrated to a water content of less than 1% by mass. The dehydration method of the present embodiment can shorten the time required for dehydration compared to a conventional dehydration method in which an organic solution is extracted by liquid separation and concentrated by azeotropy, and the decomposition or degradation of the first solute due to heating can be prevented. The water content of the dehydrated feed solution is preferably 0.95% by mass or less, 0.9% by mass or less, 0.85% by mass or less, 0.8% by mass or less, 0.75% by mass or less, or 0.7% by mass or less. It is preferably that the water content of the dehydrated feed solution be low, but from the viewpoint of process efficiency, the water content of the dehydrated feed solution may be 0.01% by mass or greater, 0.05% by mass or greater, 0.1% by mass or greater, 0.2% by mass or greater, 0.3% by mass or greater, or 0.4% by mass or greater in one aspect.

The dehydration step S103 is carried out in a dehydration apparatus 1 comprising a feed solution system 12 in which a feed solution 4 is circulated and a draw solution system 13 in which an organic draw solution 5 is circulated. The feed solution system 12 and the draw solution system 13 are preferably configured to suppress transfer of the first and second organic solvents to outside the systems due to vaporization. As a result, the volatilization of the first and second organic solvents can be prevented, and an increase in water content of the feed solution 4 and the organic draw solution 5 can be prevented.

In the dehydration step S103, the feed solution 4 which has decreased in volume due to dehydration and concentration is preferably replenished by an organic solution comprising the first organic solvent and having a water content of 0.5% by mass or less. By replenishing the feed solution 4 which has decreased in volume with an organic solution, the water content of the feed solution 4 can be further decreased. The water content of the above organic solution may be 0.4% by mass or less or 0.3% by mass or less, and from the viewpoint of availability of the organic solution, may be 0.001% by mass or greater, 0.01% by mass or greater, or 0.1% by mass or greater.

In the regeneration step S104 in FIG. 3, to obtain an organic draw solution 5 that can be reused in the dehydration step S103, water which has transferred from the feed solution 4 to the organic draw solution 5 is removed from the organic draw solution 5. After the regeneration step S104, the organic draw solution 5 processed in the regeneration step S104 may be used to carry out the dehydration step S103 again. As a result, dehydration can be carried out while maintaining a state in which the organic draw solution 5 has a higher osmotic pressure than the feed solution 4, and the final water content of the dehydrated feed solution can be further decreased.

In the regeneration step S104, the organic draw solution 5 is preferably dehydrated by azeotropic distillation or membrane treatment. The azeotropic distillation may be a reduced-pressure distillation. The membrane treatment may be a method of evaporating to remove water from the organic draw solution 5 using a pervaporation membrane which selectively permeates water. More preferably, in the regeneration step S104, a desiccant or a dehydration reagent is added to the organic draw solution 5. Substances described above are suitably used for the desiccant and the dehydration reagent.

A crystallization step S105 or a water-free reaction step S106 is subsequently carried out. In the crystallization step S105 in FIG. 3, the first solute is separated from the dehydrated feed solution obtained in the dehydration step S103 and purified by crystallization. The crystallization may be a method generally used by a person skilled in the art in the present technical field. In order to prevent degradation of the first solute due to heating or pressurization operation, a method of cooling the dehydrated feed solution or a method of adding a solvent in which the first solute is poorly soluble to the dehydrated feed solution is preferably used.

In the water-free reaction step S106 in FIG. 3, an additional reagent is added to the dehydrated feed solution obtained in the dehydration step S103, and a chemical reaction is allowed to proceed under anhydrous conditions.

The chemical reaction in the water-free reaction step S106 is a water-free reaction in which progression of a desired reaction in the presence of water is inhibited. The additional reagent may be, for example, an organometallic reagent such as a Grignard reagent or butyllithium.

Method According to Second Embodiment

As the method according to the second embodiment, a method assumed to be a procedure in the manufacturing of pharmaceuticals, in which a solute from an aqueous solution is crystallized, followed by dissolving the resulting wet crystals in an organic solvent, and then dehydrating the resulting solution and subjecting thereto a water-free reaction, will be described with reference to FIG. 4.

In the crystallization step S105 in FIG. 4, wet crystals, which are the first solute containing water, is separated from an aqueous solution comprising the first solute, which is a product of a chemical reaction. The resulting wet crystals are dissolved in the first organic solvent to obtain a crude feed solution and a feed solution 4 to be dehydrated in the crude dehydration step S102 and the dehydration step S103. Note that, the crude dehydration step S102 may be omitted. The dehydration method of the present embodiment can shorten the time required for dehydration compared to a conventional dehydration method in which the wet crystals are heated and dried under reduced pressure, and the decomposition or degradation of the first solute due to heating can be prevented.

In FIG. 4, the crude dehydration step S102, the dehydration step S103, the regeneration step S104 and the water-free reaction step S106 may be the same as those in the first embodiment. Therefore, the descriptions thereof will not be repeated.

EXAMPLES

Hereinafter, the present invention will be specifically described based on the Examples. However, the present invention is not limited to the Examples.

Experimental Method (Production of Forward Osmosis Membrane Module

A polyketone resulting from complete alternating copolymerization of ethylene and carbon monoxide and having an intrinsic viscosity of 2.2 dL/g was added to a 65% by mass resorcinol aqueous solution so that the polymer concentration was 15% by mass, dissolved with stirring at 80° C. for 2 h, and defoamed to obtain a homogeneous, transparent spinning dope. A wet-type hollow fiber spinning machine equipped with a dual spinneret was filled with the above spinning dope. A 25% by mass methanol aqueous solution from the inside of the dual spinneret and the above spinning dope from the outside were each extruded into a coagulation tank filled with a 40% by mass methanol aqueous solution to form hollow-fiber membranes by phase separation.

The obtained hollow-fiber membranes were cut to 70 cm lengths, bundled, and washed with water. The hollow-fiber membrane bundle after washing with water was subjected to solvent replacement with acetone and further subjected to solvent replacement with hexane, followed by drying at 50° C. The polyketone hollow-fiber membranes thus obtained had an outer diameter of 0.8 mm, an inner diameter of 0.5 mm, a porosity of 78%, and a membrane-wall maximum pore size of 130 nm. The hollow-fiber membrane bundle composed of 80 of the above polyketone hollow-fiber membranes was housed in a cylindrical module housing (cylindrical case) having a diameter of 2 cm and a length of 10 cm and both ends of the hollow-fiber membrane bundle were fixed with an adhesive, thereby producing a polyketone hollow-fiber support membrane module.

Using the obtained polyketone hollow-fiber support membrane module, interfacial polymerization was carried out as follows on an interior surface of each hollow-fiber membrane. 20.216 g of m-phenylenediamine and 1.52 g of sodium lauryl sulfate were charged into a 1-L container and dissolved in 991 g of pure water added thereto to prepare a first solution used for interfacial polymerization. 0.6 g of trimesic acid chloride was charged into a separate 1-L container and dissolved in 300 g of n-hexane added thereto to prepare a second solution used for interfacial polymerization.

Figure 5:
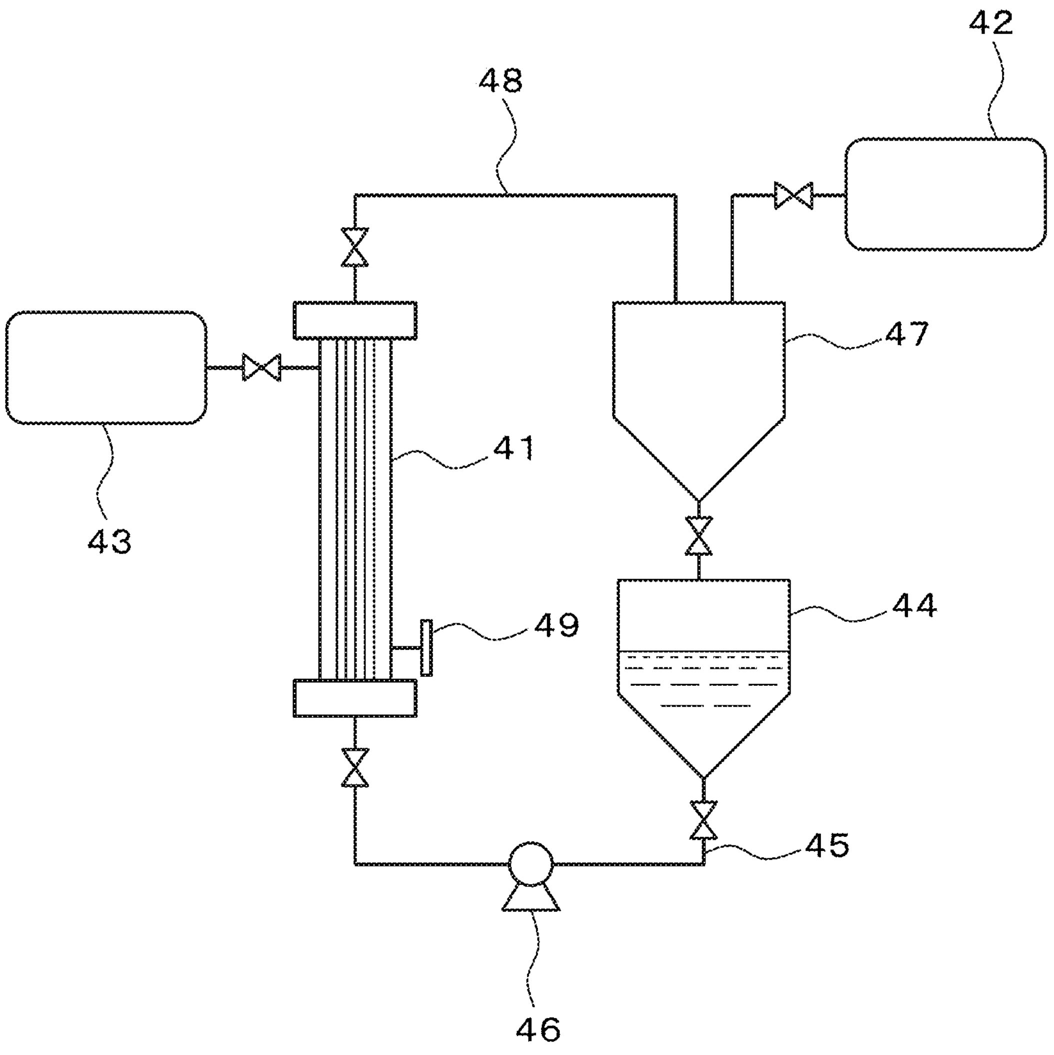
FIG. 5 is a schematic diagram showing an example of an apparatus for producing a forward osmosis membrane module.

The method of forming a separation active layer by interfacial polymerization will be described with reference to FIG. 5. In the apparatus shown in FIG. 5, in the hollow-fiber support membrane module 41 in which the insides (core side) of the hollow-fiber support membranes are filled with the first solution, the second solution delivery pipe 45 from the second solution storage tank 44 is connected to an inlet on the core side, and along the way, a second solution delivery pump 46 for pumping the second solution is connected. A second solution drainage pipe 48 from the second solution drainage tank 47 is connected to an outlet on the core side, and the tank is connected to a core-side pressure regulator 42 for controlling the pressure inside the hollow fibers of the hollow-fiber support membrane module 41. An end cap 49 is fitted to a lower conduit on the shell side of the hollow-fiber support membrane module 41, and an upper conduit is connected to a shell-side pressure regulator 43 for controlling shell pressure. The core side (insides of the hollow fibers) of the hollow-fiber support membrane module 41 is filled with the first solution and left to stand for 5 min, the liquid is drained, and while the insides of the hollow fibers are wetted with the first solution, the hollow-fiber support membrane module 41 is attached to the apparatus shown in FIG. 5. The core-side pressure was set to normal pressure by the core-side pressure regulator 42, and the shell-side pressure was set to a reduced pressure of 10 kPa as the absolute pressure by the shell-side pressure regulator 43 (core-side pressure>shell-side pressure). After leaving to stand for 2 min in this state, while the pressure was maintained, the second solution was delivered to the core side at a flow rate of 40 cc/min for 3 min by the second solution delivery pump 46, and interfacial polymerization was carried out. The polymerization temperature was 25° C.

The hollow-fiber support membrane module was subsequently removed from the apparatus and left to stand in a thermostatic chamber set to 50° C. for 5 min to vaporize and remove the n-hexane. Both of the shell side and the core side were further washed with pure water, thereby producing a forward osmosis membrane module.

(HSP Calculation)

The HSP of the separation active layer was modeled and calculated as follows. Generally, the repeating unit of the separation active layer obtained by interfacial polymerization by this method is represented by the following formula (1):

[Chem. 1]

(1)

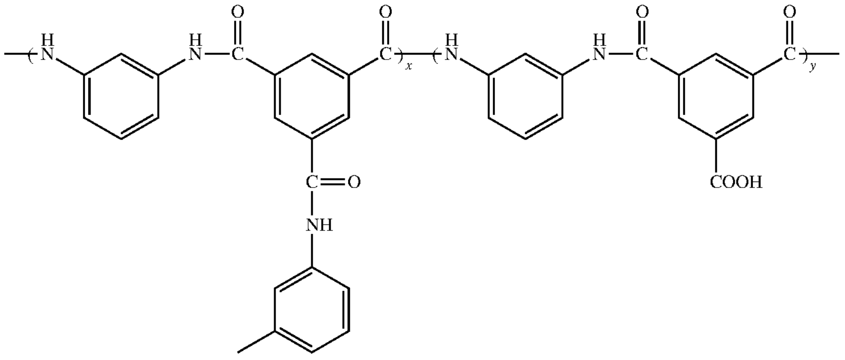

wherein x and y are each independently an integer of 1 or greater.

As represented in the above formula (1), the separation active layer has a structure in which, of the portions derived from trimesic acid chloride, a portion is crosslinked and a portion is not crosslinked (i.e., hydrolyzed).

In the above polymer structure, first, all functional groups (i.e., a hydrolyzable structural portion, specifically a hydrolyzed structural portion and a structural portion forming a branched chain in the repeating unit) that may remain unreacted without crosslinking, other than the polymer terminals, are each replaced with a hydrogen group. As a result, a structure represented by the following formula (2):

[Chem. 2]

(2)

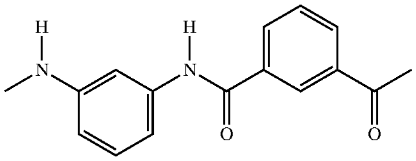

is obtained. Subsequently, in the above polymer structure, the portion relating to a chemical bond of repeating units is replaced by a methyl group. As a result, a polymer structure represented by the following formula (3):

[Chem. 3]

(3)

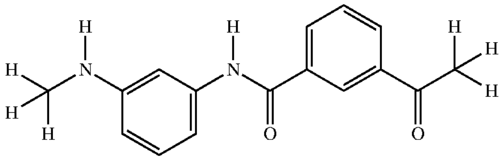

is obtained.

The HSP of the monomer structure obtained by the above modeling was calculated using the Hansen SP & QSPR model, an add-on to the commercially available software Winmostar 9.4.11, wherein δd=20.5 $(MPa)^{0.5}$; δp=11.47 $(MPa)^{0.5}$; and δH=7.22 $(MPa)^{0.5}$, and HSP was 24.58 $(MPa)^{0.5}$.

The HSP of the second organic solvent of the organic draw solution was also calculated using the Hansen SP & QSPR model, an add-on to the commercially available software Winmostar 9.4.11.

The results are summarized in Table 1.

(Measurement of Water Content)

About 0.5 mL of the feed solution, the crude feed solution, and the organic draw solution was taken with a 1-mL syringe, and about 0.1 mL was injected into a Karl Fischer moisture analyzer (Model CA-200, manufactured by Mitsubishi Chemical Analytech Co., Ltd.) to measure the water content. Note that, in Example 4 and Example 6 comprising molecular sieves as desiccants in the organic draw solution, only the supernatant of the organic draw solution was sampled.

In Example 1 to Example 3 using a dehydration reagent as the second solute, due to a competition between the dehydration reaction and the Karl Fischer reaction, the water content of the second organic solvent before adding a dehydration reagent was taken as the water content of the organic draw solution. The description "water content of less than 0.01% by mass" for Example 1 to Example 3 means that the water content of the second organic solvent not containing a dehydration reagent was 0.01% by mass, and it is presumed that the addition of the dehydration reagent thereafter further reduced the water content.

(Dehydration Efficiency)

Based on the feed solution (FS) water content and the feed solution (FS) amount, the dehydration efficiency was determined based on the following formula. Note that t was set to 30 (min).

[Math. 5]

$$\text{Dehydration efficiency}\,(\%) = 100 \times \left(1 - \frac{(FS\text{ water content after } t\text{ min}(\%)) \times (FS\text{ amount after } t\text{ min}(g))}{(FS\text{ water content after 0 min}(\%)) \times (FS\text{ amount after 0 min}(g))}\right)$$

The value of dehydration efficiency (%) was evaluated according to the following criteria.

A: 40% or greater

B: 30% or greater and less than 40%

C: less than 30%

Example 1

The present Example was carried out at room temperature (23° C.) using the dehydration apparatus shown in FIG. 1. 200 mL of an isopropyl acetate solution containing 10% by mass of octaacetyl sucrose as the first solute was used as the feed solution. The initial water content of the feed solution was 2.0% by mass. 400 mL of an isopropyl acetate solution, containing 10% by mass of triethyl orthoformate and a catalytic amount of pyridinium p-toluenesulfonate (PPTS) as the second solute, was used as the organic draw solution. The initial water content of the organic draw solution was less than 0.01% by mass. The feed solution tank and the draw solution tank were covered so that organic solvents would not transfer to outside the tanks due to vaporization. The feed solution and the organic draw solution were circulated at flow rates of 40 mL/min and 340 mL/min, respectively, and were brought into contact via the forward osmosis membrane. After operating the dehydration apparatus for 4 h, the water content of the recovered dehydrated feed solution was 0.6% by mass.

Example 2

200 mL of an ethyl acetate solution containing 10% by mass of octaacetyl sucrose as the first solute was used as the feed solution. The initial water content of the feed solution was 3.0% by mass. 400 mL of an ethyl acetate solution containing 10% by mass of triethyl orthoformate and a catalytic amount of p-toluenesulfonic acid as the second solute was used as the organic draw solution. The initial water content of the organic draw solution was less than 0.01% by mass. The feed solution tank and the draw solution tank were covered so that organic solvents would not transfer to outside the tanks due to vaporization. After operating the dehydrating apparatus under the same conditions as in Example 1, the water content of the recovered dehydrated feed solution was 0.7% by mass.

Example 3

200 mL of a tetrahydrofuran (THF) solution containing 10% by mass of quinine as the first solute was used as the feed solution. The initial water content of the feed solution was 9.0% by mass. 400 mL of a tetrahydrofuran solution containing 10% by mass of triethyl orthoformate and a catalytic amount of pyridinium p-toluenesulfonate (PPTS) as the second solute was used as the draw solution. The initial water content of the organic draw solution was less than 0.01% by mass. The feed solution tank and the draw solution tank were covered so that organic solvents would not transfer to outside the tanks due to vaporization. After operating the dehydration apparatus under the same conditions as in Example 1, the water content of the recovered dehydrated feed solution was 0.8% by mass.

Example 4

200 mL of a tetrahydrofuran solution containing 10% by mass of quinine as the first solute was used as the feed solution. The initial water content of the feed solution was 9.0% by mass. 400 mL of a tetrahydrofuran solution containing 10% by mass of toluene as the second solute and about 100 g of molecular sieves as the desiccant was used as the draw solution. The initial water content of the organic draw solution was 0.01% by mass. The feed solution tank and the draw solution tank were covered so that organic solvents would not transfer to outside the tanks due to vaporization. After operating the dehydration apparatus under the same conditions as in Example 1, the water content of the recovered dehydrated feed solution was 0.9% by mass.

Example 5

200 mL of a tetrahydrofuran solution containing 10% by mass of quinine as the first solute was used as the feed solution. The initial water content of the feed solution was 3.0% by mass. 2000 mL of tetrahydrofuran as the second solute was used as the organic draw solution. The initial water content of the organic draw solution was 0.1% by mass. The feed solution tank and the draw solution tank were covered so that organic solvents would not transfer to outside the tanks due to vaporization. After operating the dehydration apparatus for 7 h under the same conditions as in Example 1, the water content of the recovered dehydrated feed solution was 0.9% by mass.

Example 6

200 mL of an isopropyl acetate solution containing 10% by mass of octaacetyl sucrose as the first solute was used as the feed solution. The initial water content of the feed solution was 2.0% by mass. 600 mL of isopropyl acetate containing about 100 g of molecular sieves as the desiccant was used as the organic draw solution. The initial water content of the organic draw solution was 0.01% by mass. In the present Example, the dehydration operation was carried out without covering the feed solution tank and the draw solution tank. After operating the dehydration apparatus for 5 h under the same conditions as in Example 1, the water content of the recovered dehydrated feed solution was 0.8% by mass.

Comparative Example 1

In Comparative Example 1, an aqueous solution instead of an organic solution was used as the draw solution. 200 mL of a tetrahydrofuran solution containing 10% by mass of quinine was used as the first solute. The initial water content of the feed solution was 9.0% by mass. 400 mL of an aqueous solution containing 20% by mass of magnesium chloride as the second solute was used as the draw solution. The feed solution tank and the draw solution tank were covered so that solvents would not transfer to outside the tanks due to vaporization. After operating the dehydrating apparatus for 1.5 h under the same conditions as in Example 1, the water content of the recovered dehydrated feed solution was measured and found to be 7.2% by mass. The water content of the feed solution decreased but could not reach less than 1% by mass.

Comparative Example 2

In Comparative Example 2, an aqueous solution was used as the draw solution, in the same manner as in Comparative Example 1. 200 mL of a tetrahydrofuran solution containing 10% by mass of quinine as the first solute was used as the feed solution. The initial water content of the feed solution was 1.3% by mass. 400 mL of an aqueous solution containing 20% by mass of magnesium chloride as the second solute was used as the draw solution. The feed solution tank and the draw solution tank were covered so that solvents would not transfer to outside the tanks due to vaporization.

After operating the dehydration apparatus for 1.5 h under the same conditions as in Example 1, the water content of the recovered dehydrated feed solution was measured and found to be 4.8% by mass. As a result, the water content of the feed solution increased, and the feed solution could not be dehydrated.

Comparative Example 3

In Comparative Example 3, an aqueous solution was used as the draw solution, in the same manner as in Comparative Example 1. 200 mL of an ethyl acetate solution containing 10% by mass of octaacetyl sucrose as the first solute as used as the feed solution. The initial water content of the feed solution was 2.1% by mass. 400 mL of an aqueous solution containing 20% by mass of magnesium chloride as the second solute was used as the draw solution. The feed solution tank and the draw solution tank were covered so that solvents would not transfer to outside the tanks due to vaporization. After operating the dehydration apparatus for 1.5 h under the same conditions as in Example 1, the water content of the recovered dehydrated feed solution was measured and found to be 2.4% by mass. As a result, the water content of the feed solution increased, and the feed solution could not be dehydrated.

Comparative Example 4

In Comparative Example 4, an aqueous solution was used as the draw solution, in the same manner as in Comparative Example 1. In addition, methanol, which permeates the forward osmosis membrane, was selected as the first organic solvent. 1000 mL of a methanol solution containing 1% by mass of octaacetyl sucrose as the first solute was used as the feed solution. The initial water content of the feed solution was 10.2% by mass. 1600 mL of an aqueous solution containing 10% by mass of magnesium chloride as the second solute was used as the draw solution. The feed solution tank and the draw solution tank were covered so that solvents would not transfer to outside the tanks due to vaporization. After operating the dehydration apparatus for 7 h under the same conditions as in Example 1, the water content of the recovered dehydrated feed solution was measured and found to be 38.5% by mass. As a result, the water content of the feed solution increased, and the feed solution could not be dehydrated.

Comparative Example 5

In Comparative Example 5, methanol, which permeates the forward osmosis membrane, was selected as the first organic solvent and the second organic solvent. 900 mL of a methanol solution containing 1% by mass of octaacetyl sucrose as the first solute was used as the feed solution. The initial water content of the feed solution was 9.4% by mass. 1400 mL of a methanol solution containing 10% by mass of magnesium chloride as the second solute was used as the organic draw solution. The initial water content of the organic draw solution was 0.13% by mass. The feed solution tank and the draw solution tank were covered so that organic solvents would not transfer to outside the tanks due to vaporization. After operating the dehydration apparatus for 3.5 h under the same conditions as Example 1, the water content of the recovered dehydrated feed solution was measured and found to be 3.0% by mass. The water content of the feed solution decreased, but could not reach less than 1% by mass.

Comparative Example 6

Comparative Example 6 was tested under the condition that the organic draw solution had a higher initial water content than the feed solution. 200 mL of a t-butyl methyl ether solution containing 5% by mass of octaacetyl sucrose as the first solute was used as the feed solution. The initial water content of the feed solution was 1.3% by mass. 600 mL of an isopropyl acetate solution containing 10% by mass of toluene as the second solute was used as the draw solution. The initial water content of the organic draw solution was 1.5% by mass. The feed solution tank and the draw solution tank were covered so that organic solvents would not transfer to outside the tanks due to vaporization. After operating the dehydration apparatus for 1 h under the same conditions as in Example 1, the water content of the recovered dehydrated was measured and found to be 1.4% by mass. As a result, the water content of the feed solution increased, and the feed solution could not be dehydrated.

Example 7

200 g of a tetrahydrofuran solution containing 0.1% by mass of octaacetyl sucrose as the first solute was used as the feed solution. The initial water content of the feed solution was 1.1% by mass. 400 g of tetrahydrofuran was used as the organic draw solution. The initial water content of the organic draw solution was 0.01% by mass. The feed solution tank and the draw solution tank were covered so that organic solvents would not transfer to outside the tanks due to vaporization. After operating the dehydration apparatus for 2 h under the same conditions as in Example 1, the water content of the recovered dehydrated feed solution was 0.4% by mass. In addition, the dehydration efficiency determined from the water content and weight of the feed solution measured after 0 min and 30 min was 33% (B rating).

Example 8

200 g of a tetrahydrofuran solution containing 0.1% by mass of octaacetyl sucrose as the first solute was used as the feed solution. The initial water content of the feed solution was 1.1% by mass. 400 g of ethyl acetate was used as the organic draw solution. The initial water content of the organic draw solution was 0.01% by mass. The feed solution tank and the draw solution tank were covered so that organic solvents would not transfer to outside the tanks due to vaporization. After operating the dehydration apparatus for 2 h under the same conditions as in Example 1, the water content of the recovered dehydrated feed solution was 0.4% by mass. In addition, the dehydration efficiency determined from the water content and weight of the feed solution measured after 0 min and 30 min was 42% (A rating).

Example 9

200 g of a tetrahydrofuran solution containing 0.1% by mass of octaacetyl sucrose as the first solute was used as the feed solution. The initial water content of the feed solution was 1.1% by mass. 400 g of methanol was used as the organic draw solution. The initial water content of the organic draw solution was 0.01% by mass. The feed solution tank and the draw solution tank were covered so that organic solvents would not transfer to outside the tanks due to vaporization. After operating the dehydration apparatus for 2 h under the same conditions as in Example 1, the water content of the recovered dehydrated feed solution was 0.5% by mass. In addition, the dehydration efficiency determined from the water content and weight of the feed solution measured after 0 min and 30 min was 23% (C rating).

Example 10

200 g of a tetrahydrofuran solution containing 0.1% by mass of octaacetyl sucrose as the first solute was used as the feed solution. The initial water content of the feed solution was 1.1% by mass. 400 g of a mixed solution of tetrahydrofuran and cyclohexane at a volume ratio of 1:3 was used as the organic draw solution. The initial water content of the organic draw solution was 0.01% by mass. The feed solution tank and the draw solution tank were covered so that organic solvents would not transfer to outside the tanks due to vaporization. After operating the dehydration apparatus for 2 h under the same conditions as in Example 1, the water content of the recovered dehydrated feed solution was 0.9% by mass. In addition, the dehydration efficiency determined from the water content and weight of the feed solution measured after 0 min and 30 min was 27% (C rating).

Example 11

200 g of a tetrahydrofuran solution containing 0.1% by mass of octaacetyl sucrose as the first solute was used as the feed solution. The initial water content of the feed solution was 1.1% by mass. 400 g of a mixed solution of tetrahydrofuran and cyclohexane at a volume ratio of 1:1 was used as the draw solution. The initial water content of the organic draw solution was 0.01% by mass. The feed solution tank and the draw solution tank were covered so that organic solvents would not transfer to outside the tanks due to vaporization. After operating the dehydration apparatus for 2 h under the same conditions as in Example 1, the water content of the recovered dehydrated feed solution was 0.8% by mass. In addition, the dehydration efficiency determined from the water content and weight of the feed solution measured after 0 min and 30 min was 39% (B rating).

Example 12

200 g of a tetrahydrofuran solution containing 0.1% by mass of octaacetyl sucrose as the first solute was used as the feed solution. The initial water content of the feed solution was 1.1% by mass. 400 g of a mixed solution of tetrahydrofuran and N-methylpyrrolidone at a volume ratio of 1:1 was used as the draw solution. The initial water content of the organic draw solution was 0.01% by mass. The feed solution tank and the draw solution tank were covered so that organic solvents would not transfer to outside the tanks due to vaporization. After operating the dehydration apparatus for 2 h under the same conditions as in Example 1, the water content of the recovered dehydrated feed solution was 0.4% by mass. In addition, the dehydration efficiency determined from the water content and weight of the feed solution measured after 0 min and 30 min was 32% (B rating).

Example 13

200 g of a tetrahydrofuran solution containing 0.1% by mass of octaacetyl sucrose as the first solute was used as the feed solution. The initial water content of the feed solution was 1.1% by mass. 400 g of a mixed solution of tetrahydrofuran and dichloromethane at a volume ratio of 1:1 was used as the draw solution. The initial water content of the organic draw solution was 0.01% by mass. The feed solution tank and the draw solution tank were covered so that organic solvents would not transfer to outside the tanks due to vaporization. After operating the dehydration apparatus for 2 h under the same conditions as in Example 1, the water content of the recovered dehydrated feed solution was 0.5% by mass. In addition, the dehydration efficiency determined from the water content and weight of the feed solution measured after 0 min and 30 min was 41% (A rating).

Example 14

200 g of a tetrahydrofuran solution containing 0.1% by mass of octaacetyl sucrose as the first solute was used as the feed solution. The initial water content of the feed solution was 1.1% by mass. 400 g of a mixed solution of tetrahydrofuran and dichloromethane at a volume ratio of 1:3 was used as the draw solution. The initial water content of the organic draw solution was 0.01% by mass. The feed solution tank and the draw solution tank were covered so that organic solvents would not transfer to outside the tanks due to vaporization. After operating the dehydration apparatus for 2 h under the same conditions as in Example 1, the water content of the recovered dehydrated feed solution was 0.8% by mass. In addition, the dehydration efficiency determined from the water content and weight of the feed solution measured after 0 min and 30 min was 38% B rating).

Example 15

200 g of a tetrahydrofuran solution containing 0.1% by mass of octaacetyl sucrose as the first solute was used as the feed solution. The initial water content of the feed solution was 1.1% by mass. 400 g of a mixed solution of tetrahydrofuran and dichloromethane at a volume ratio of 1:9 as the draw solution. The initial water content of the organic draw solution was 0.01% by mass. The feed solution tank and the draw solution tank were covered so that organic solvents would not transfer to outside the tanks due to vaporization. After operating the dehydration apparatus for 2 h under the same conditions as in Example 1, the water content of the recovered dehydrated feed solution was 0.9% by mass. In addition, the dehydration efficiency determined from the water content and weight of the feed solution measured after 0 min and 30 min was 37% (B rating).

Results of the above Examples and Comparative Examples are shown in Tables 2 and 3.

TABLE 1

| | Solubility parameters | | |
|---|---|---|---|
| Substance name | δd $(MPa)^{0.5}$ | δp $(MPa)^{0.5}$ | δH $(MPa)^{0.5}$ |
| Aromatic polyamide | 20.50 | 11.47 | 7.22 |
| Tetrahydrofuran | 16.71 | 4.88 | 5.79 |
| Ethyl acetate | 15.73 | 6.31 | 7.50 |
| Isopropyl acetate | 15.55 | 5.09 | 6.13 |
| Methanol | 16.44 | 12.31 | 21.69 |
| Cyclohexane | 16.56 | 1.91 | 3.05 |
| N-methylpyrrolidone | 17.98 | 9.94 | 7.21 |
| Dichloromethane | 17.33 | 6.45 | 8.95 |
| Tetrahydrofuran/Cyclohexane = 25/75 | 16.60 | 2.65 | 3.74 |
| Tetrahydrofuran/Cyclohexane = 50/50 | 16.64 | 3.40 | 4.42 |
| Tetrahydrofuran/N-methylpyrrolidone = 50/50 | 17.35 | 7.41 | 6.50 |
| Tetrahydrofuran/Dichloromethane = 50/50 | 17.02 | 5.67 | 7.37 |

TABLE 1-continued

| Substance name | Solubility parameters δd $(MPa)^{0.5}$ | δp $(MPa)^{0.5}$ | δH $(MPa)^{0.5}$ |
|---|---|---|---|
| Tetrahydrofuran/Dichloromethane = 25/75 | 17.18 | 6.06 | 8.16 |
| Tetrahydrofuran/Dichloromethane = 10/90 | 17.27 | 6.29 | 8.63 |

5 organic draw solution
6, 7 feed solution delivery pipe
8 feed solution delivery pump
9, 10 draw solution delivery pipe
11 draw solution delivery pump
12 feed solution system
13 draw solution system
20 forward osmosis membrane module
21, 22 shell-side conduit
23 forward osmosis membrane
24, 25 adhesive fixing portion

TABLE 2

| | | Feed solution | | | Organic draw solution | | | Result |
|---|---|---|---|---|---|---|---|---|
| | Solvent vapor-ization preventive measures | First organic solvent | First solute | Initial water content at dehydration step (% by mass) | Second organic solvent (water is comparison) | Second solute or desiccant | Initial water content at dehydration step (% by mass) | Water content of dehydrated feed solution (% by mass) |
| Example 1 | yes | isopropyl acetate | octaacetyl sucrose | 2.0 | isopropyl acetate | triethyl orthoformate + pyridinium p-toluenesulfonate | <0.01 | 0.6 |
| Example 2 | yes | ethyl acetate | octaacetyl sucrose | 3.0 | ethyl acetate | triethyl orthoformate + p-toluenesulfonic acid | <0.01 | 0.7 |
| Example 3 | yes | tetrahydrofuran | quinine | 9.0 | tetrahydrofuran | triethyl orthoformate + pyridinium p-toluenesulfonate | <0.01 | 0.8 |
| Example 4 | yes | tetrahydrofuran | quinine | 9.0 | tetrahydrofuran | toluene + molecular sieve | 0.01 | 0.9 |
| Example 5 | yes | tetrahydrofuran | quinine | 3.0 | tetrahydrofuran | — | 0.1 | 0.9 |
| Example 6 | no | isopropyl acetate | octaacetyl sucrose | 2.0 | isopropyl acetate | molecular sieve | 0.01 | 0.8 |
| Comparative Example 1 | yes | tetrahydrofuran | quinine | 9.0 | water | magnesium chloride | 80 | 7.2 |
| Comparative Example 2 | yes | tetrahydrofuran | quinine | 1.3 | water | magnesium chloride | 80 | 4.8 |
| Comparative Example 3 | yes | ethyl acetate | octaacetyl sucrose | 2.1 | water | magnesium chloride | 80 | 2.4 |
| Comparative Example 4 | yes | methanol | octaacetyl sucrose | 10.2 | water | magnesium chloride | 80 | 38.5 |
| Comparative Example 5 | yes | methanol | octaacetyl sucrose | 9.4 | methanol | magnesium chloride | 0.13 | 3.0 |
| Comparative Example 6 | yes | t-butyl methyl ether | octaacetyl sucrose | 1.3 | isopropyl acetate | toluene | 1.5 | 1.4 |

TABLE 3

| | Separation active layer | Organic draw solution | ΔHSP $(MPa)^{0.5}$ | Saturation water content (% by mass) | Dehydration efficiency | Final water content (% by mass) |
|---|---|---|---|---|---|---|
| Example 7 | aromatic polyamide | tetrahydrofuran | 10.1 | miscible with water at any ratio | B | 0.4 |
| Example 8 | aromatic polyamide | ethyl acetate | 10.8 | 4 | A | 0.4 |
| Example 9 | aromatic polyamide | methanol | 16.6 | miscible with water at any ratio | C | 0.5 |
| Example 10 | aromatic polyamide | tetrahydrofuran/cyclohexane = 25/75 | 12.3 | 0.3 | C | 0.9 |
| Example 11 | aromatic polyamide | tetrahydrofuran/cyclohexane = 50/50 | 11.5 | 0.8 | B | 0.8 |
| Example 12 | aromatic polyamide | tetrahydrofuran/N-methylpyrrolidone = 50/50 | 7.5 | miscible with water at any ratio | B | 0.4 |
| Example 13 | aromatic polyamide | tetrahydrofuran/dichloromethane = 50/50 | 9.1 | 2.4 | A | 0.5 |
| Example 14 | aromatic polyamide | tetrahydrofuran/dichloromethane = 25/75 | 8.6 | 0.7 | B | 0.8 |
| Example 15 | aromatic polyamide | tetrahydrofuran/dichloromethane = 10/90 | 8.4 | 0.2 | C | 0.9 |

REFERENCE SIGNS LIST

1 dehydration apparatus
2 feed solution tank
3 draw solution tank
4 feed solution
26, 27 header
28, 29 core-side conduit
30 housing
41 hollow-fiber support membrane module
42 core-side pressure regulator
43 shell-side pressure regulator

44 second solution storage tank
45 second solution delivery pipe
46 second solution delivery pump
47 second solution drainage tank
48 second solution drainage pipe
49 end cap
S101 liquid separation step
S102 crude dehydration step
S103 dehydration step
S104 regeneration step
S105 crystallization step
S106 water-free reaction step

The invention claimed is:

1. A method for dehydrating a feed solution comprising a first organic solvent, water, and a first solute, comprising a dehydration step of bringing the feed solution into contact with an organic draw solution comprising a second organic solvent via a forward osmosis membrane to obtain a dehydrated feed solution which is dehydrated to a water content of less than 1% by mass, wherein an initial water content of the feed solution in the dehydration step is 1% by mass or greater and less than 30% by mass, and an initial water content of the organic draw solution is less than the initial water content of the feed solution wherein the forward osmosis membrane is a composite membrane constituted of a separation active layer and a microporous support membrane, a solubility parameter difference ΔHSP between the organic draw solution and the separation active layer is $\Delta HSP<16\ (MPa)^{0.5}$, and a saturation water content of the organic draw solution is 0.5% by mass or greater.

2. The method according to claim 1, wherein solubility parameters of the organic draw solution are $13\ (MPa)^{0.5}\leq\delta d\leq 20\ (MPa)^{0.5}$, $2\ (MPa)^{0.5}\leq\delta p\leq 18\ (MPa)^{0.5}$, and $2\ (MPa)^{0.5}\leq\delta H\leq 28\ (MPa)^{0.5}$.

3. The method according to claim 1, wherein the organic draw solution further comprises a second solute and/or a desiccant.

4. The method according to claim 1, wherein the dehydration step is carried out in a dehydration apparatus comprising a feed solution system in which the feed solution is circulated; and a draw solution system in which the organic draw solution is circulated, and the feed solution system and the draw solution system are configured to suppress transfer of the first organic solvent and the second organic solvent to outside the systems due to vaporization.

5. The method according to claim 1, wherein the second organic solvent is at least one selected from the group consisting of tetrahydrofuran, 2-methyl tetrahydrofuran, methyl acetate, ethyl acetate, propyl acetate, isopropyl acetate, butyl acetate, isobutyl acetate, toluene, cyclopentyl methyl ether, t-butyl methyl ether, acetonitrile, dimethylacetamide, N-methylpyrrolidone, hexafluoroisopropyl alcohol, acetic acid, acetone, anisole, benzene, chlorobenzene, carbon tetrachloride, chloroform, cumene, cyclohexane, 1,2-dichloroethane, 1,2-dichloroethene, dichloromethane, 1,2-dimethoxyethane, N,N-dimethylformamide, dimethyl sulfoxide, 1,4-dioxane, ethyl ether, ethyl formate, formamide, formic acid, heptane, hexane, methyl butyl ketone, methylcyclohexane, methyl ethyl ketone, methyl isobutyl ketone, pentane, nitromethane, pyridine, sulfolane, tetralin, 1,1,1-trichloroethane, 1,1,2-trichloroethene, and xylene.

6. The method according to claim 1, wherein in the dehydration step, the feed solution which has decreased in volume due to dehydration and concentration is replenished by an organic solution comprising the first organic solvent and having a water content of 0.5% by mass or less.

7. The method according to claim 1, wherein the first solute in the dehydrated feed solution is subjected to a water-free reaction, in which the first solute and an additional reagent undergo a chemical reaction under anhydrous conditions.

8. The method according to claim 1, wherein the method further comprises a crystallization step of purifying the first solute by crystallization.

9. The method according to claim 1, wherein the method further comprises a liquid separation step of extracting an organic layer from a solution comprising the first solute before the dehydration step, and the organic layer is used as the feed solution.

10. The method according to claim 1, wherein the method further comprises a regeneration step, and the regeneration step is a step of removing water which has transferred from the feed solution to the organic draw solution from the organic draw solution.

11. The method according to claim 10, wherein in the regeneration step, a desiccant or a dehydration reagent is added into the organic draw solution.

12. The method according to claim 10, wherein in the regeneration step, the organic draw solution is dehydrated by azeotropic distillation or membrane treatment.

13. The method according to claim 1, wherein the method further comprises a crude dehydration step before the dehydrating step, and the crude dehydration step is a step of bringing a crude feed solution into contact with an aqueous draw solution comprising a third solute via a forward osmosis membrane to obtain a feed solution dehydrated to a water content of 1% by mass or greater and less than 30% by mass.

14. The method according to claim 13, wherein the crude dehydration step is carried out in a dehydration apparatus comprising a feed solution system in which the crude feed solution is circulated; and a draw solution system in which the aqueous draw solution is circulated, and the feed solution system is configured to suppress transfer of the first organic solvent due to vaporization.

15. The method according to claim 13, wherein in the crude dehydration step, the crude feed solution which has decreased in volume due to dehydration and concentration is replenished by an organic solution comprising the first organic solvent and having a water content of 0.5% by mass or less.

16. The method according to claim 1, wherein the method is used in manufacturing of pharmaceuticals.

* * * * *